(12) United States Patent
Korenev (10) Patent No.: US 8,783,011 B2
(45) Date of Patent: Jul. 22, 2014

(54) PARTICULATE MATTER DETECTION STRATEGY IN EXHAUST FILTER

(75) Inventor: Sergey Korenev, Mundelein, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 13/326,935

(22) Filed: Dec. 15, 2011

(65) Prior Publication Data

US 2013/0152546 A1 Jun. 20, 2013

(51) Int. Cl.
*F01N 3/00* (2006.01)

(52) U.S. Cl.
USPC ............ 60/274; 60/275; 60/295; 60/297; 60/311

(58) Field of Classification Search
USPC ............ 60/274, 275, 295, 297, 311
See application file for complete search history.

(56) References Cited

U.S. PATENT DOCUMENTS

| | | | | |
|---|---|---|---|---|
| 4,477,771 A | * | 10/1984 | Nagy et al. | 324/636 |
| 5,195,317 A | * | 3/1993 | Nobue et al. | 60/275 |
| 5,423,180 A | * | 6/1995 | Nobue et al. | 60/274 |
| 5,497,099 A | * | 3/1996 | Walton | 324/641 |
| 7,157,919 B1 | * | 1/2007 | Walton | 324/641 |
| 7,253,641 B2 | | 8/2007 | Knitt et al. | |
| 8,225,684 B2 | * | 7/2012 | Kondo et al. | 73/865.8 |
| 8,384,396 B2 | * | 2/2013 | Bromberg et al. | 324/636 |
| 2005/0247131 A1 | * | 11/2005 | Breuer | 73/579 |
| 2010/0108890 A1 | | 5/2010 | Gunasekaran et al. | |

FOREIGN PATENT DOCUMENTS

WO  WO2009/008525  1/2009

OTHER PUBLICATIONS

Abbas Pourzaki and Hossein Mirzaee, "New High Voltage Pulse Generators," 2009, Recent Patents on Electrical Engineering 2009, 2, 65-76.*

Matsushima Machinery Laborator Co., Ltd., Pulse Radar Type Microwave Level Meter, Oct. 2007, 6 pages, MWLM Series, Japan.

* cited by examiner

*Primary Examiner* — Binh Q Tran (74) *Attorney, Agent, or Firm* — Liell & McNeil (57) ABSTRACT

Detecting particulate matter in an exhaust filter includes receiving data indicative of a time delay between transmission and reception of electromagnetic energy propagated through trapped particulate matter, and outputting a signal indicative of an amount of the trapped particulate matter responsive to the data.

20 Claims, 4 Drawing Sheets

PARTICULATE MATTER DETECTION STRATEGY IN EXHAUST FILTER

TECHNICAL FIELD

The present disclosure relates generally to detecting particulate matter in an exhaust filter, and more particularly to detecting particulate matter responsive to a time delay between transmission and reception of electromagnetic energy propagated through particulate matter trapped within the exhaust filter.

BACKGROUND

A great many different types of aftertreatment systems have been used in connection with internal combustion engines for decades. In many instances, it is desirable to remove particulates in exhaust from internal combustion engines, and exhaust particulate filters or "traps" are widely used for this purpose. While many exhaust particulate filters are quite effective at trapping soot, eventually the quantity of trapped soot reaches a point at which continued operation of the engine becomes problematic or less efficient, or risks damaging the exhaust particulate filter. "Regeneration" is a term generally used to describe the process of cleansing an exhaust particulate filter of trapped soot. One typical approach involves raising the temperature within the filter to a point sufficient to combust the trapped soot and convert it into less undesirable or more readily treated emissions.

A number of different regeneration techniques are well known and widely used. Among these are the use of catalysts resident within an exhaust particulate filter or carried within the engine fuel. Catalysts can assist in combustion of soot at relatively lower temperatures than what might otherwise be required. Other regeneration techniques rely upon injection of a fuel into the exhaust gases, which subsequently ignites upstream of, or upon entering the exhaust particulate filter to increase the temperature therein. Still other techniques utilize in-cylinder dosing or dosing downstream the engine and upstream the filter, to deliver a fuel which raises filter temperature by way of an exothermic reaction without actually igniting. Electrically powered heaters and the like, unconventional engine timing and/or fueling techniques, and backpressure generating flow restrictors are also used. Regeneration technologies utilizing catalysts tend to be quite expensive, whereas techniques employing electric heaters or specialized engine operation strategies may siphon off energy from the engine. Delivery of fuel into the exhaust gases directly consumes fuel, whereas generating back pressure can reduce the ease with which exhaust gases exit the engine. It will thus be readily apparent that most, if not all, regeneration strategies carry some sort of cost or efficiency penalty.

In many regeneration strategies it is thus desirable to detect an amount of trapped soot within the filter with relative precision and accuracy. On the one hand, it is typically desirable to avoid operating an engine system with an inordinately packed filter, while on the other hand it is desirable to avoid overuse of energy and/or reactant-consuming regeneration strategies. For these reasons, engineers are continually seeking techniques to more accurately and precisely detect an actual amount of trapped soot so that underuse and overuse of regeneration can be avoided. Even seemingly miniscule improvements in detecting soot load, and thus suitable regeneration conditions, can translate into significant real world gains in efficiency.

One general class of soot detection technologies employs electromagnetic energy transmitted through an exhaust particulate filter, and reduced in strength as a portion of the electromagnetic energy is absorbed by trapped soot. These techniques have been known for a number of years, but have yet to achieve their full theoretical potential. Certain of these strategies seek to detect soot based upon observation of phenomena such as frequency shift or other signal attributes in electromagnetic energy transmitted through trapped soot. Others have sought to link the extent of reduction in signal strength to soot amount. These known techniques tend to be computationally challenging, require the use of relatively expensive and complex hardware, or suffer from other shortcomings. Moreover, strategies which appear to perform acceptably in the lab are often discovered to be poorly suited to actual field conditions.

One example strategy leveraging the response of a particulate filter and matter trapped therein to electromagnetic energy is set forth in U.S. Pat. No. 4,477,771 to Nagy et al. Nagy et al. propose exciting a microwave resonant cavity with microwave energy, and monitoring a response of the cavity to sense the effective dielectric constant of material within the cavity to provide a measure of soot content in the filter. As with certain other earlier designs, Nagy et al. appear to rely upon inducing resonance of the chamber, which can be fairly sensitive to filter canister geometry and other factors, and may have certain of the other disadvantages noted above.

SUMMARY

In one aspect, a method of detecting particulate matter in an exhaust filter for an internal combustion engine includes receiving data indicative of a time delay between transmission and reception of electromagnetic energy propagated through particulate matter trapped within a filter medium of the exhaust filter. The method further includes outputting a signal indicative of an amount of the trapped particulate matter responsive to the data.

In another aspect, an exhaust filter system for an internal combustion engine includes an exhaust filter including a housing having an exhaust inlet, an exhaust outlet, and a filter medium positioned within the housing and configured to trap particulates in exhaust gases passed from the exhaust inlet to the exhaust outlet. The system further includes a particulate sensing mechanism coupled with the exhaust filter and having at least one probe configured to transmit electromagnetic energy within the housing, and to receive transmitted electromagnetic energy propagated through particulate matter trapped within the filter medium. The particulate sensing mechanism further includes an electronic control unit coupled with the at least one probe, and being configured to determine a value indicative of an amount of the trapped particulate matter responsive to a time delay between transmitting and receiving the electromagnetic energy.

In still another aspect, a method of operating an exhaust filter system includes transmitting electromagnetic energy through an exhaust filter having a filter medium containing trapped particulate matter. The method further includes receiving transmitted electromagnetic energy propagated through the trapped particulate matter, and commanding regeneration of the exhaust filter responsive to a time delay between the transmission and the reception of the electromagnetic energy.

DETAILED DESCRIPTION

Figure 1:
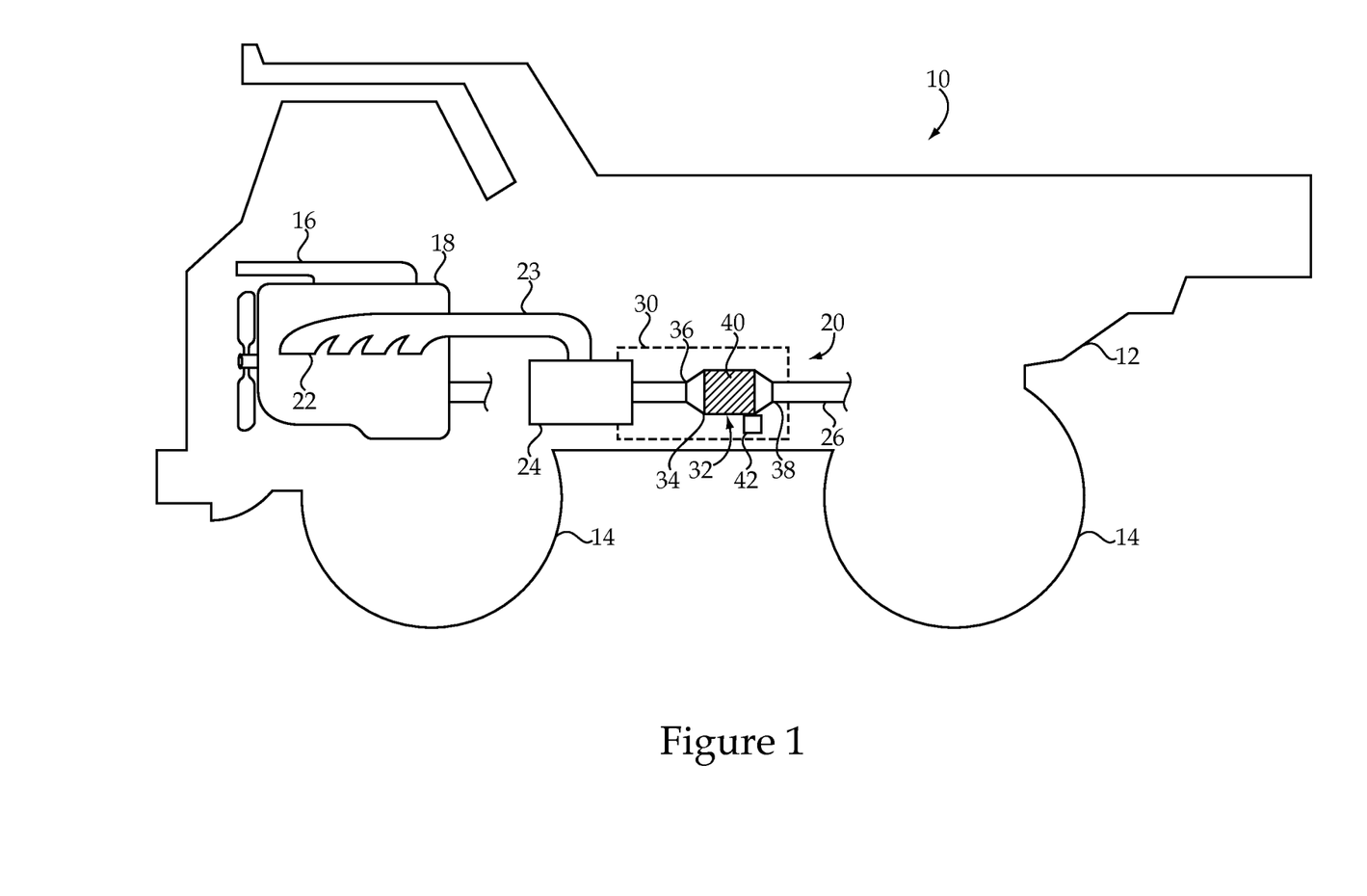
FIG. 1 is a side diagrammatic view of a machine according to one embodiment.

Referring to FIG. 1, there is shown a machine 10 according to one embodiment. Machine 10 is shown in the context of an off-highway truck having a frame 12, and ground engaging propulsion wheels 14 coupled with frame 12. In other embodiments, machine 10 might include a track-type machine having ground engaging tracks rather than propulsion wheels, or still another type of machine such as a motor grader, a backhoe, a wheel loader, a scraper, or even a marine vessel. Machine 10 might also include a stationary machine such as a generator, compressor or pump. Machine 10 may be equipped with an internal combustion engine 18 such as a compression ignition diesel engine, providing motive power to ground engaging wheels 14. An intake manifold 16 is coupled with engine 18 in a conventional manner, and an exhaust system 20 having an exhaust manifold 22. System 20 includes an exhaust particulate filter system 30 having an exhaust particulate filter 32 fluidly connected with engine 18 and configured to trap particulate matter such as soot and ash carried in engine exhaust. As will be further apparent from the following description, system 30 may be uniquely configured for detecting particulate matter trapped in filter 32, and responsively controlling filter regeneration.

Filter 32 may include a canister or housing 34 having an exhaust inlet 36 fluidly connected with an exhaust conduit 23 coupled with engine 18 in a conventional manner, and an exhaust outlet 38 fluidly connected to an outlet conduit 26 such as an exhaust stack or tailpipe. A regeneration mechanism 24 may be positioned fluidly between engine 18 and filter 32 to enable regeneration of filter 32 in a manner and under circumstances further described herein. A filter medium 40 is positioned within housing 34 to trap the subject particulate matter. Filter medium 40 might include a monolithic or cartridge-type ceramic filter medium, or any other suitable type of filter medium. A particulate sensing mechanism 42 may be coupled with filter 32, and operable to detect particulate matter trapped within medium 40, for timing regeneration of filter 32 as further described herein.

Figure 2:
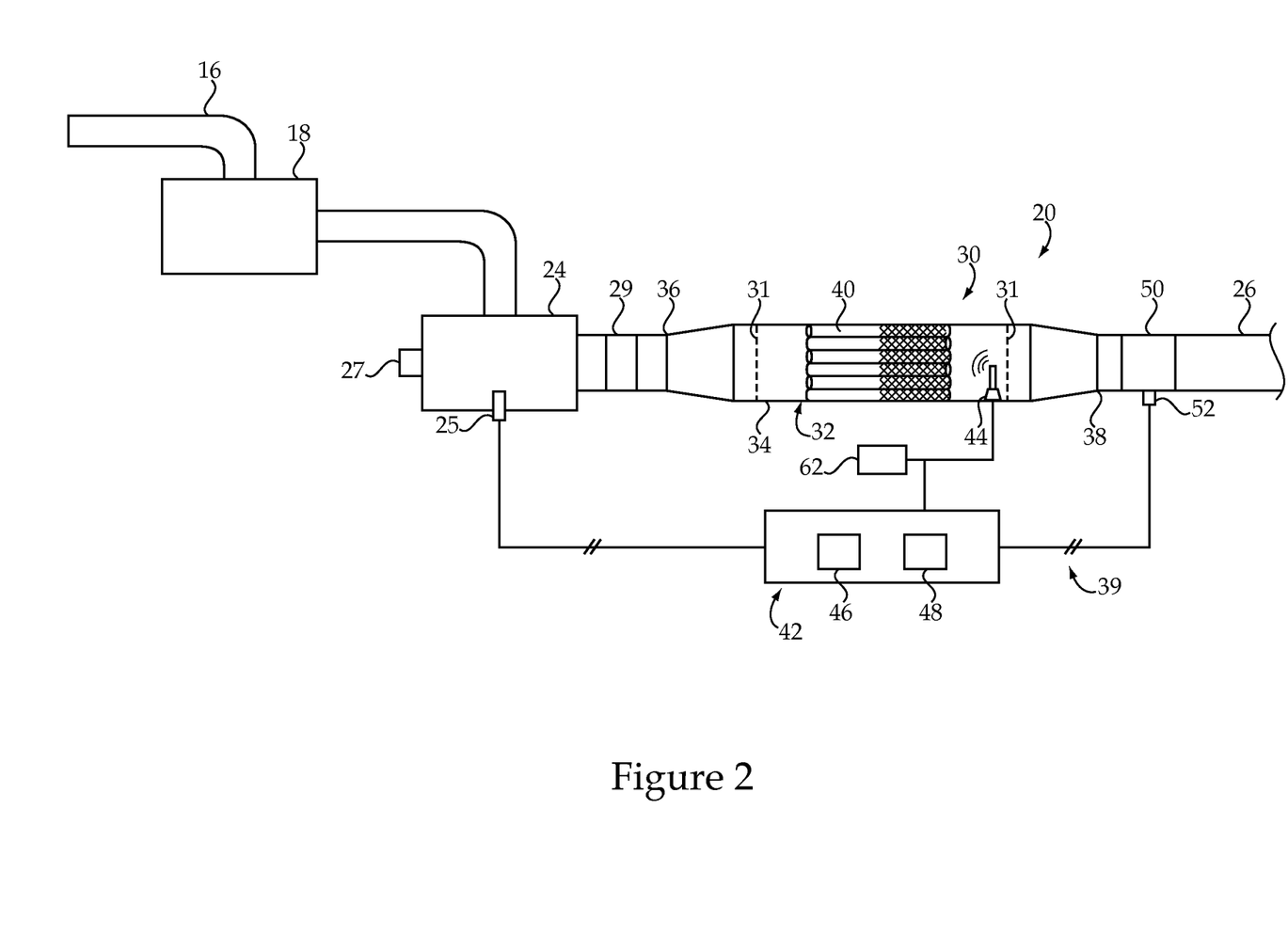
FIG. 2 is a diagrammatic view of an exhaust system coupled with an internal combustion engine, according to one embodiment.

Referring also now to FIG. 2, there are shown certain components and features of exhaust system 20 in greater detail. As noted above, regeneration mechanism 24 may be configured to regenerate filter 32, for example when an amount of trapped particulate matter such as soot in filter 22 exceeds a desired threshold. Filter medium 40 might include resident catalyst materials, or catalysts might be otherwise supplied to an exhaust gas stream passing to filter 32 to assist in combustion of trapped soot. In any event, in one embodiment regeneration mechanism 24 may include an air inlet 27 for supplying air into the exhaust gases passing to filter 32. Regeneration mechanism 24 may also include a fuel delivery device such as an electrically actuated fuel nozzle 25 for supplying a fuel such as liquid diesel distillate into the exhaust gases to combust, and thereby raise the temperature of exhaust gases passing to filter 32 to initiate and/or maintain combustion of trapped soot. Any other suitable regeneration technique such as a dosing system or a backpressure-generating flow restrictor downstream filter 32 might be used. A NOx reducing mechanism 50, such as a selective catalytic reduction ("SCR") module might also be positioned downstream filter 32 to reduce NOx in exhaust gases prior to emitting the gases to ambient. An electrically actuated injector 52 or other reductant delivery device may be part of mechanism 50.

Filter system 30 may further include a control system 39, in control communication with each of devices 25 and 52. Control system 39 may also include a particulate sensing mechanism 42 coupled with filter 32 and having at least one probe 44 positioned within or extending into housing 34. Probe 44 may be positioned downstream filter medium 60 in a path of filtered exhaust gases passing to exhaust outlet 38. In a practical implementation strategy, system 39 may include a total of one probe. Positioning probe 44 as described herein prevents accumulation of particulate matter, in particular soot, thereon, which might otherwise interfere with its operation. Probe 44 is configured to transmit electromagnetic energy within housing 34, such that the transmitted electromagnetic energy is propagated through particulate matter trapped within filter medium 40. Probe 44 may also be configured to receive transmitted electromagnetic energy having been propagated through the trapped particulate matter. A first and a second metallic screen 31 may be positioned upstream filter medium 40 and downstream probe 44 to contain electromagnetic energy within housing 34 in a manner that will be familiar to those skilled in the art. Control system 39 may further include a generator 62 coupled with probe 44 and also with a data processor 46. Mechanism 42 may be considered a part of control system 39, and data processor 46 a part of mechanism 42, though data processor 46 may have duties other than just detecting particulate matter. Data processor 46, which may be or be a part of an electronic control unit, may be coupled with a computer readable memory 48 storing software for executing the various monitoring and control functions discussed herein. The terms "data processor" and "electronic control unit" are use interchangeably herein. Memory 48 may also store data relating to the timing of transmitting and receiving electromagnetic energy, for purposes of detecting soot responsive thereto, and also further described herein.

Figure 3:
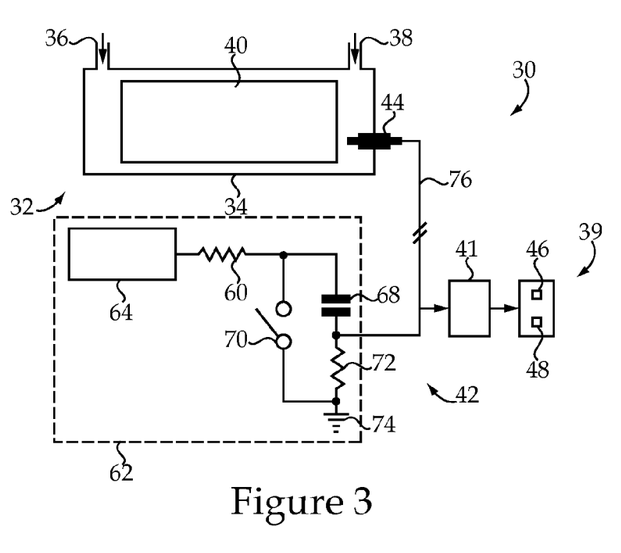
FIG. 3 is a diagrammatic view of a portion of the exhaust system of FIG. 2.

Referring now also to FIG. 3, there are shown certain features of systems 30 and 39 in still further detail. As noted above, electronic control unit 46 may be coupled with probe 44 and with generator 62, and thereby configured to receive data indicative of a time delay between transmission and reception of electromagnetic energy propagated through trapped particulate matter within filter 32. Electronic control unit 46 may determine a value indicative of an amount of the trapped particulate matter responsive to the data, for purposes such as monitoring soot loading in filter 32, and timing regeneration thereof. In one practical implementation strategy, electronic control unit 46 may output a signal for each of a plurality of times that an amount of particulate matter is sensed during operating system 30 to trap particulates from filter 18, thereby generating a stored history of particulate loading over time on memory 48. Each outputted signal may encode a determined value indicative of an amount, such as a relative amount, of trapped particulate matter within filter medium 40 at the time of sensing. Electronic control unit 46, or another data processor, may command regeneration of filter 32 responsive to a determined value indicating a soot amount appropriate for regeneration, such as by outputting a control command to device 25. It should be appreciated that descriptions herein of outputting a signal should not be understood to mean that electronic control unit 46 necessarily transmits a signal to another device, as merely generating a signal internally for subsequent processing would satisfy this subject matter.

As shown in FIG. 3, generator 62 may include several subcomponents, namely, a DC power supply 64, a capacitor 68, a switch 70, a first resistor 66 configured for charging capacitor 68, and a second resistor 72, as well as a ground 74. These subcomponents may together comprise an analog circuit for generating an oscillating voltage as capacitor 68 discharges in response to closing switch 70. The oscillating voltage causes probe 44 to emit electromagnetic energy which is transmitted within housing 34, and in particular propagates through particulate matter trapped within filter medium 40. Switch 70 may include a thyratron or a spark inductor, or another suitable oscillator. Filter 32 may behave as a cavity having electromagnetic wave propagation properties dependent at least in part upon dielectric properties of housing 34, filter medium 20, and trapped particulate matter, as further discussed herein. An equivalent circuit of the subject cavity, comprised of housing 34 plus filter medium 40 and trapped particulate matter may be understood as an LC circuit. Accordingly, for generating oscillations suitable for inducing emission of electromagnetic energy from probe 44, a mechanism affecting inductance such as a spark inductor, thyratron, or other switch as noted above, provides a practical implementation strategy.

Electromagnetic energy transmitted from probe 44 may include a pulse having a pulse duration less than about 1 microsecond, and in certain embodiments from about 50 nanoseconds to about 300 nanoseconds. Those skilled in the art will recognize such a duration of electromagnetic transmission as being quite short compared to most particulate matter sensing strategies employing electromagnetic energy, such as those where signal attenuation or quality factor are used to detect soot amount. A plurality of electromagnetic frequencies may be transmitted in the pulse, in the range of about 700 MHz to about 3000 MHz. Although the present disclosure is not thusly limited, such a frequency range is considered to result in readily detectable reflected signals having acceptable signal to noise ratios, and promotes distribution of the electric field of the electromagnetic energy within housing 34. In different sized exhaust filters, other frequencies might be used, or in laboratory research within the scope of the present disclosure. A plurality of frequencies also tend to result in washing out any disparate interactions between the transmitted electromagnetic energy and the particulate matter at different frequencies. As used herein, the term "about" should be understood in the context of rounding to a consistent number of significant digits. Accordingly, "about 700 MHz" means from 650 to 749 MHz, "about 50 nanoseconds" means from 45 nanoseconds to 54 nanoseconds, and so on. As noted above, probe 44 may also sense transmitted electromagnetic energy after having propagated through the trapped particulate matter, and reflected back to probe 44. In a practical implementation strategy, generator 62 may induce probe 44 to transmit the pulse of electromagnetic energy such that a pulse duration thereof is less than the time delay between the transmission and the reception of the electromagnetic energy of the pulse. This strategy can avoid overlap in time between transmitting and receiving electromagnetic energy when using a single probe. An instantaneous power output of probe 44 may be about 1 kilowatt, such that overall power consumption of mechanism 42 is quite low as compared with certain known designs. A signal line 76 extends between generator 62 and probe 44, and a voltage sensor 41 is coupled with signal line 76, and in turn coupled with electronic control unit 46 to transmit data to or be interrogated by electronic control unit 46. Thus, electronic control unit 46 may monitor a voltage of communication line 76 to detect both a transmission time and a reception time of the electromagnetic energy, in turn enabling electronic control unit 46 to determine a time delay therebetween. The transmission times and reception times of interest may be average times, for the plurality of frequencies. Since generator 62 may transmit the electromagnetic energy in microbunches, superpositioned oscillations, analysis by electronic control unit 46 to determine average transmission and reception times may be relatively simple, although the present disclosure is not thereby limited.

Figure 4:
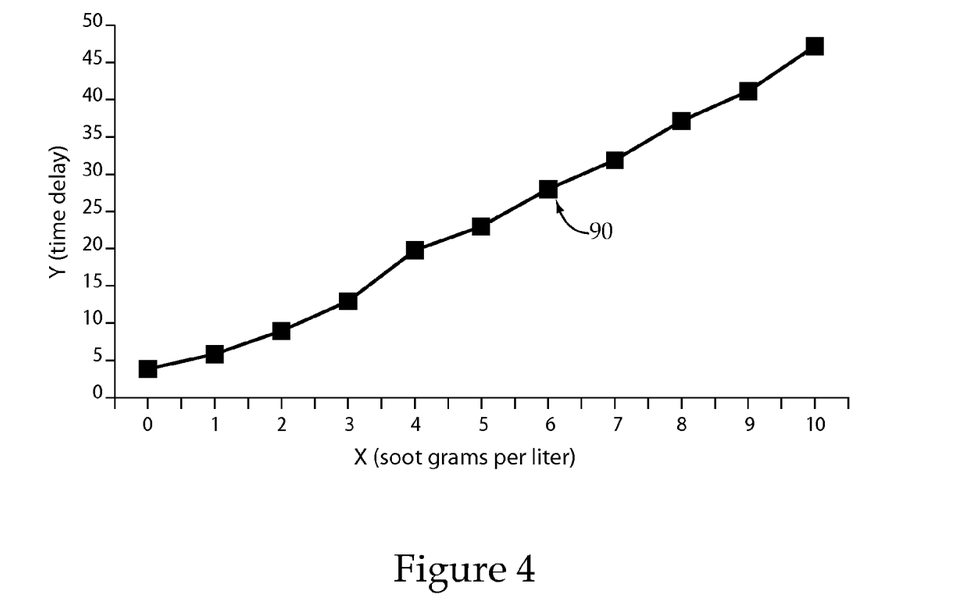
FIG. 4 is a graph of relative soot amount versus time delay between transmitting and receiving electromagnetic energy.

Turning now to FIG. 4, there is shown a graph showing relative soot amount in soot grams per liter on the X-axis, and time delay in nanoseconds on the Y-axis. In the illustrated example, time delay is between transmission and reception of electromagnetic energy propagated through trapped particulate matter as discussed herein. Accordingly, the time delays shown on the Y-axis in FIG. 4 may correspond to the time between sensing a voltage pulse corresponding to transmission of electromagnetic energy, and sensing a subsequent voltage pulse corresponding to reception of the transmitted electromagnetic energy, or more particularly a portion thereof since some of the transmitted electromagnetic energy will typically be absorbed during propagation. It may be noted from FIG. 4 that a roughly linear relationship is shown between time delay and relative soot amount. At approximately 6 soot grams per liter, a regeneration point 90 is shown. Mechanism 42 might be used to continuously or intermittently monitor soot loading in filter 32, up until approximately 6 soot grams per liter is reached, a common soot loading state used to trigger regeneration. In other instances, various parameters associated with machine 10 or engine 16 may exist which make earlier filter regeneration desirable. To this end, filter regeneration might be commanded at a lower relative amount of soot, for example because conditions indicate that machine 10 is parked, or engine 18 is at low idle, and that regeneration is not likely to interfere with or detract from operation of machine 10 or engine 18.

Figure 5:
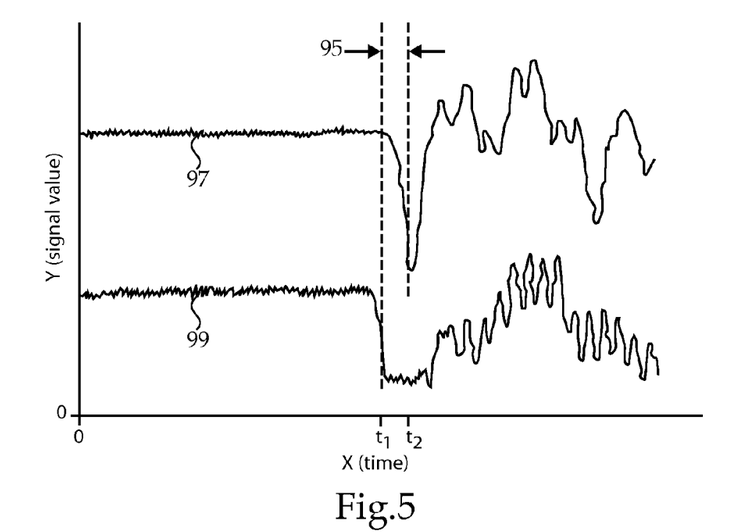
FIG. 5 is a graph of signal value for transmitted and received electromagnetic energy.

Turning now to FIG. 5, there is shown another graph illustrating a first signal trace 97 and a second signal trace 99 over time. Signal value is shown on the Y-axis, and the X-axis represents time. In the illustrated example, signal trace 99 corresponds to a signal from generator 62, whereas signal trace 97 represents a received signal. Signal traces 97 and 99 are shown as they might appear measured on two different channels of a monitoring device. At a first time, $t_1$, it may be noted that signal trace 99 shows a change in value, such as might be detected upon transmitting electromagnetic energy via probe 44. At a later time, $t_2$, signal trace 97 shows a change in value, as might be expected where reflected electromagnetic energy is detected. In other words, transmission occurs at about time $t_1$, and detection of an initial reflection peak occurs at about time $t_2$. A time delay 95 between times $t_1$ and $t_2$ may be used to indicate the relative amount of trapped particulate matter, including soot, as discussed herein. Those skilled in the art will therefore appreciate that a relatively lesser amount of soot might be associated with a relatively earlier time $t_2$, and a relatively greater amount of soot associated with a relatively later time $t_2$.

INDUSTRIAL APPLICABILITY

Those skilled in the art will be familiar with dielectric materials, artificial dielectrics, and theoretical and practical applications of dielectric properties to the detection of particulate matter in an exhaust filter for an internal combustion engine. Nagy et al., discussed above, is one example where dielectric properties of an exhaust particulate filter are leveraged to detect soot. The present disclosure represents different insights, based upon the velocity of propagation of electromagnetic waves in a cavity, and the implementation of hardware capable of operating quickly and robustly enough to leverage those insights for detecting particulate matter. In particular, the velocity V of propagation of electromagnetic waves in a cavity may be expressed by the equation:

$$V = C / \sqrt{\in_{average(DPF+soot)} \cdot \mu}$$

where C is the speed of light in a vacuum, $\in$ is the electric constant, and $\mu$ is the magnetic constant. Considering the exhaust particulate filter (DPF) as a cavity, containing dielectric material, or in the case of soot an effectively or artificially dielectric material, as soot load increases $\in$ becomes larger. Another way to understand this phenomenon is that the permittivity of the cavity to the electric field of the transmitted electromagnetic energy decreases, reducing the speed of propagation of the electromagnetic waves. Since $\in$ is based on an average of both the materials of exhaust particulate filter itself, soot, and other materials such as water and ash, the change in $\in$ results in the increased time delay with increased soot loading which is leveraged to indicate relative soot amount in the manner discussed herein.

Figure 6:
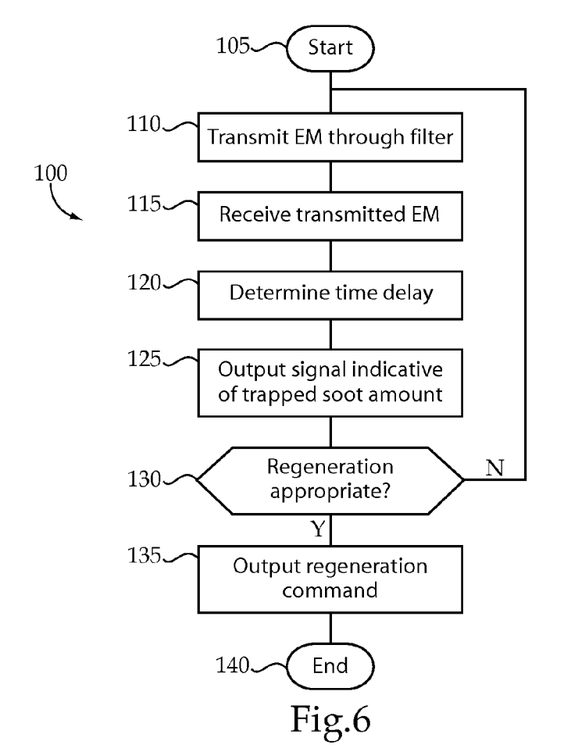
FIG. 6 is a flowchart illustrating a control process according to one embodiment.

Referring now to FIG. 6, there is shown an example control process according to the present disclosure by way of a flowchart 100. The process of flowchart 100 may start at step 105, and proceed to step 110 to transmit EM (electromagnetic energy) through the filter. From step 110, the process may proceed to step 115 to receive transmitted EM, and thenceforth to step 120 to determine the time delay between transmission and reception. From step 120, the process may proceed to step 125 to output a signal indicative of trapped soot amount. Determining a value as discussed with regard to electronic control unit 46 may occur in step 125, or just prior. At step 125, electronic control unit 46 might reference a stored table or the like, containing a time delay coordinate and a relative soot amount coordinate, perform a calculation, or otherwise determine and output a signal encoding the determined value. From step 125, the process may proceed to step 130 to query whether regeneration is appropriate. If no, the process may loop back to execute steps 110 through 130 again. If yes, the process may proceed ahead to step 135 to output a regeneration command. From step 135, the process may proceed to end at step 140.

Those skilled in the art will be familiar with the attenuation of electromagnetic energy in response to propagation through soot. In addition to monitoring time delay as described herein, the present disclosure contemplates monitoring the reduction in strength of transmitted electromagnetic energy as a strategy for validating the use of time delay in detecting particulate matter. The voltage sensed on signal line 76 may be indicative of a strength of the transmitted electromagnetic energy and a strength of the received electromagnetic energy. Accordingly, electronic control unit 46 might consult a table or map storing soot amount values in comparison with signal attenuation values, and compare a determined soot amount based on time delay against a soot amount expected to correspond with a determined reduction in strength of the received electromagnetic energy. Certain strategies for soot detection based upon attenuation of electromagnetic energy enable calculating an actual amount of soot within the filter rather than a relative amount. The relative amount of trapped soot may depend upon an amount of trapped ash since ash occupies space within the filter. For this reason, consideration of the amount of ash based on an ash loading model or an independent ash detection strategy may be used to arrive at a predicted relative soot amount based on attenuation for comparing with a relative soot amount based upon time delay.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of detecting particulate matter in an exhaust filter for an internal combustion engine comprising the steps of:
   propagating electromagnetic energy through particulate matter trapped within a filter medium of the exhaust filter;
   receiving data via an electronic control unit indicative of a time delay between transmission and reception of electromagnetic energy dependent upon a speed at which the electromagnetic energy is propagated; and
   outputting a signal via the electronic control unit indicative of an amount of the trapped particulate matter responsive to the data.

2. The method of claim 1 further comprising a step of transmitting the electromagnetic energy via a probe positioned downstream the filter medium in a flow of filtered exhaust gases passing to an exhaust outlet of the exhaust filter.

3. The method of claim 2 further comprising a step of receiving the transmitted electromagnetic energy via the probe.

4. The method of claim 3 wherein the step of transmitting includes transmitting a pulse of electromagnetic energy having a pulse duration, less than about 1 microsecond.

5. The method of claim 4 wherein the step of transmitting further includes transmitting electromagnetic frequencies from about 700 MHz to about 3000 MHz in the pulse.

6. A method of detecting particulate matter in an exhaust filter for an internal combustion engine comprising the steps of:
   receiving data indicative of a time delay between transmission and reception of electromagnetic energy propagated through particulate matter trapped within a filter medium of the exhaust filter;
   outputting a signal indicative of an amount of the trapped particulate matter responsive to the data;
   transmitting the electromagnetic energy via a probe positioned downstream the filter medium in a flow of filtered exhaust gases passing to an exhaust outlet of the exhaust filter;
   receiving the transmitted electricity via the probe; and
   energizing the probe for transmitting the electromagnetic energy via an analog circuit having one of a spark inductor and a thyratron;
   wherein the step of transmitting includes transmitting a pulse of electromagnetic energy having a pulse duration, less than about 1 microsecond; and
   wherein the step of transmitting further includes transmitting electromagnetic frequencies from about 700 MHz to about 3000 MHz in the pulse.

7. The method of claim 6 wherein the step of energizing further includes energizing the probe such that an instantaneous power output of the probe is about 1 kW.

8. The method of claim 2 wherein the step of outputting further includes outputting a signal indicative of a relative amount of soot trapped within the filter medium.

9. An exhaust filter system for an internal combustion engine comprising:
- an exhaust filter including a housing having an exhaust inlet, an exhaust outlet, and a filter medium positioned within the housing and configured to trap particulates in exhaust gases passed from the exhaust inlet to the exhaust outlet; and
- a particulate sensing mechanism coupled with the exhaust filter and including at least one probe configured to transmit electromagnetic energy within the housing, and to receive transmitted electromagnetic energy propagated through particulate matter trapped within the filter medium at a speed of propagation dependent upon an amount of the trapped particulate matter;
- the particulate sensing mechanism further including an electronic control unit coupled with the at least one probe, and being configured to determine a value indicative of an amount of the trapped particulate matter responsive to a time delay between transmitting and receiving the electromagnetic energy dependent upon the speed of propagation.

10. The system of claim 9 further comprising a regeneration initiation mechanism, and wherein the electronic control unit is further configured to output a control command to the regeneration initiation mechanism responsive to the determined value.

11. The system of claim 10 wherein the determined value is indicative of a relative amount of trapped soot within the filter medium.

12. The system of claim 10 wherein the at least one probe includes a total of one probe, and is positioned downstream the filter medium in a path of filtered exhaust gases passed to the exhaust outlet.

13. The system of claim 9 wherein the at least one probe is configured to transmit a pulse of electromagnetic energy having a pulse duration less than about 1 microsecond.

14. The system of claim 12 wherein the pulse of electromagnetic energy includes a plurality of electromagnetic frequencies from about 700 MHz to about 300 MHz.

15. The system of claim 13 wherein an instantaneous power output of the at least one probe is about 1 kW during transmitting the pulse.

16. A method of operating an exhaust filter system comprising the steps of:
- transmitting electromagnetic energy through an exhaust filter having a filter medium containing trapped particulate matter;
- receiving transmitted electromagnetic energy propagated through the trapped particulate matter at a speed of propagation dependent upon an amount of the trapped particulate matter; and
- commanding regeneration of the exhaust filter via outputting a control command from an electronic control unit, responsive to a time delay between the transmission and the reception of the electromagnetic energy dependent upon the speed of propagation.

17. The method of claim 16 wherein the steps of transmitting and receiving take place via a single probe positioned downstream the filter medium in a flow of filtered exhaust gases passing to an exhaust outlet of the exhaust filter.

18. The method of claim 17 wherein the step of commanding includes outputting a regeneration initiation command responsive to a relative amount of the trapped particulate matter as indicated by the time delay.

19. The method of claim 18 wherein the step of transmitting includes transmitting a pulse of electromagnetic energy having a pulse duration, and the step of receiving includes receiving reflected electromagnetic energy having a time delay since the transmission which is greater than the pulse duration.

20. The method of claim 19 further comprising the steps of detecting an initial reflection peak in the transmitted electromagnetic energy, and determining the time delay responsive to detecting the initial reflection peak.

* * * * *

UNITED STATES PATENT AND TRADEMARK OFFICE
CERTIFICATE OF CORRECTION

PATENT NO. : 8,783,011 B2
APPLICATION NO. : 13/326935
DATED : July 22, 2014
INVENTOR(S) : Sergey Korenev It is certified that error appears in the above-identified patent and that said Letters Patent is hereby corrected as shown below:

In the Claims

Column 8, line 55, in Claim 6, delete "electricity" and insert -- electromagnetic energy --.

Signed and Sealed this
Eighth Day of September, 2015

Michelle K. Lee
*Director of the United States Patent and Trademark Office*